United States Patent [19]
Hodgson et al.

[11] 3,953,192
[45] *Apr. 27, 1976

[54] NON-CAKING HYDROXY-ALUMINUM POLYMER-COATED AMMONIUM SALT COMPOSITIONS

[75] Inventors: Clive Hodgson, Forest Knolls; George R. Hawkes, Concord; Marion G. Reed, Hacienda Heights; William G. Toland, San Rafael, all of Calif.

[73] Assignee: Chevron Research Company, San Francisco, Calif.

[ * ] Notice: The portion of the term of this patent subsequent to Dec. 3, 1991, has been disclaimed.

[22] Filed: July 10, 1974

[21] Appl. No.: 487,066

Related U.S. Application Data

[63] Continuation-in-part of Ser. No. 323,571, Jan. 15, 1973, Pat. No. 3,852,055.

[52] U.S. Cl. .................................. 71/59; 71/60; 71/61; 71/64 E; 149/5; 149/46; 427/215; 428/403
[51] Int. Cl.² ..................... C05C 1/00; C05C 1/02
[58] Field of Search .............. 117/100 B; 71/59, 60, 71/64 E, 1, 61, 64 F; 427/215; 428/403; 149/5, 46

[56] References Cited
UNITED STATES PATENTS

| 3,027,250 | 3/1962 | Michelitsch | 71/64 E |
| 3,116,108 | 12/1963 | Brouwers | 71/64 E |
| 3,171,717 | 3/1965 | Enok | 117/100 |
| 3,230,038 | 1/1966 | Wilson | 117/100 |
| 3,317,307 | 5/1967 | Wise et al. | 117/100 B |
| 3,660,070 | 5/1972 | Maruta et al. | 117/100 B |
| 3,672,945 | 6/1972 | Taylor | 117/100 B |
| 3,679,391 | 7/1972 | Jack et al. | 117/100 B |
| 3,852,055 | 12/1974 | Hawkes et al. | 71/59 |

FOREIGN PATENTS OR APPLICATIONS 891,562   3/1962   United Kingdom

Primary Examiner—Ronald H. Smith
Assistant Examiner—Dennis C. Konopacki
Attorney, Agent, or Firm—G. F. Magdeburger; Dix A. Newell; Raymond Owyang

[57] ABSTRACT

The caking tendency of ammonium salt compositions during storage is reduced by coating the compositions with a minor amount of a hydroxy-aluminum polymer.

14 Claims, No Drawings

NON-CAKING HYDROXY-ALUMINUM POLYMER-COATED AMMONIUM SALT COMPOSITIONS

RELATED APPLICATION

This application is a continuation-in-part of U.S. Ser. No. 323,571, filed January 15, 1973, now U.S. Pat. No. 3,852,055, which is directed to reducing the caking tendency of ammonium salts by uniformly incorporating therein a minor amount of a hydroxy-aluminum polymer.

BACKGROUND OF THE INVENTION

This invention relates to non-caking fertilizers and explosives. It is known that granular, powdery or crystallized fertilizer compositions, particularly ammonium nitrate compositions, tend to cake while stored either in bulk or packages. Fertilizer compositions which cake are not amenable to usual bulk storing and handling techniques and after storage cannot be applied easily in the field with mechanical distribution devices.

U.K. Pat. No. 1,119,702, published July 10, 1968, discloses that the caking tendency of granular nitrate-containing fertilizers can be reduced by incorporating into the fertilizer a small amount of aluminum hydroxide or a basic aluminum salt. Non-caking, non-hygroscopic ammonium nitrate-containing finely-dispersed aluminum salts of higher fatty acids are disclosed in Czech. application No. 98,596, published November 23, 1959 [Chem. Abs., 56, 8296d (1962)]. U.K. Pat. No. 891,562, published March 14, 1962, and Belgian application No. 587,791, published August 18, 1960, disclose non-caking ammonium nitrate-containing aluminum sulfate.

U.S. Pat. No. 3,027,250, issued March 27, 1962 to W. Michelitsch, discloses the dusting of urea particles with a coating of basic aluminum sulfate to prevent agglomeration of the urea particles.

SUMMARY OF THE INVENTION

It has now been found that solid, non-caking, particulate ammonium salt compositions are produced by coating the compositions with about 0.01 to 5% by weight of a hydroxy-aluminum polymer.

DESCRIPTION OF THE INVENTION

The Hydroxy-Aluminum Polymers

The hydroxy-aluminum polymers employed for preparing the non-caking compositions of the invention are known. These polymers can be prepared by the controlled addition of an alkali metal base, e.g., sodium hydroxide, to an aqueous solution of a water-soluble aluminum salt. It is believed that when the base is added to an aluminum salt solution, $OH^-$ ions link the $Al^{3+}$ ions together, forming stable rings composed of six Al atoms per unit. When the molar ratio of OH/Al is in the range of 0 to 2.1, the reaction involves the formation of single units of compositions $[Al_6(OH)_2]^{6+}$ or double units $[Al_{10}(OH)_{22}]^{8+}$. With ratios from 2.25 to 2.7, the additional $OH^-$ reacts with these simple units and forms a continuous series of higher polymers.

In general, any aluminum salt having a solubility of about 25% by weight in hot water (70°–100°C) is suitably employed for the preparation of the hydroxy-aluminum polymers. Suitable inorganic aluminum salts include aluminum chloride, aluminum bromide, aluminum iodide, aluminum nitrate and aluminum sulfate. Suitable organic aluminum salts include salts of carboxylic acids such as aluminum lactate and aluminum alkanoates of 2 to 5 carbon atoms, e.g., aluminum acetate and aluminum propionate.

In order to reduce the tendency of fertilizer compositions to cake, the hydroxy-aluminum polymer should have a hydroxyl-to-aluminum molar ratio from about 1 to 2.9, preferably about 1.7 to 2.7, and most preferably from about 2.0 to 2.5.

Provided the hydroxy-aluminum polymer has the hydroxy/aluminum molar ratios defined above, the reduction in caking tendency of fertilizer compositions produced by the hydroxy-aluminum polymers is independent of the nature of the anion portion of the aluminum salt employed to prepare the hydroxy-aluminum polymer. However, due largely to their plant nutrient value, nitrate and sulfate anions are preferred.

The nature of hydroxy-aluminum polymers and their preparation are discussed by P. H. Hsu and T. F. Bates, in *Soil Science Society of America Proceedings*, 28, No. 6, 763–769 (1964), and in "Formation of X-ray Amorphous and Crystalline Aluminum Hydroxides", *Mineralogical Magazine*, 33, 749–768 (1964).

Ammonium Salt Composition

The term "ammonium salt composition", as used herein, refers to a composition comprising an ammonium salt or a mixture of ammonium salts, such as ammonium nitrate, ammonium sulfate, ammonium phosphate, monoammonium phosphate, diammonium phosphate, ammonium chloride, and ammonium nitrate-containing fertilizers, e.g., ammonium nitrate sulfate; 30-0-0, containing 70% ammonium nitrate and 30% ammonium sulfate; 16-16-16, containing 38% ammonium nitrate, 25% potassium chloride, and 14% ammonium phosphates; 27-12-0, containing 52% ammonium nitrate and 21% ammonium phosphates; 22-22-0, containing 53% ammonium nitrate and 20% ammonium phosphates; 10-20-20, containing 21% ammonium nitrate, 32% potassium chloride and 14% ammonium phosphates; 13-34-10, containing 18% ammonium nitrate, 44% ammonium phosphates and 16% potassium chloride; 20-10-10, containing 57% ammonium nitrate and 16% potassium chloride; and 15-5-25, containing 40% ammonium nitrate, 6% ammonium phosphates and 48% potassium sulfate. Preferred ammonium salt compositions are ammonium nitrate/ammonium phosphate-containing fertilizer compositions.

Although the hydroxy-aluminum polymers are useful for inhibiting the caking of fertilizer in powdered form, they are particularly useful for fertilizers in particulate forms, e.g., granules or prills. Particulate fertilizers will generally be macroparticles of at least 20 Tyler mesh or greater.

The caking tendency of a hygroscopic ammonium salt composition increases with increasing water content of the composition. The hydroxy-aluminum polymers are effective for inhibiting the caking of ammonium salt compositions having 1% or more by weight, based on total weight of composition, of water, and are particularly effective for inhibiting the caking of ammonium salt compositions having 0.5% to 1%, calculated on the same basis, of water.

The exact amount of hydroxy-aluminum polymer coating employed with the ammonium salt composition will vary, depending upon the particular salt, the use to which the composition will be made, the conditions under which it will be stored, the amount of cake resistance desired, and the presence of other materials. Generally, however, the amount of hydroxy-aluminum polymer (solid basis) coating employed is in the range of 0.01% to 5% by weight, based on the weight of the total composition, although best results are obtained with amounts in the range of from about 0.1 to 5%, more preferably, from about 0.5 to 5% by weight, calculated on the same basis.

The hydroxy-aluminum polymer must be evenly coated on the ammonium salt composition particles. In the preferred modification, the ammonium salt composition is coated by spraying an aqueous solution of the hydroxy-aluminum polymer onto prills or granules of the ammonium salt composition and simultaneously drying the coated composition. When the ammonium salt composition is coated with an aqueous solution of the hydroxy-aluminum polymer, it is often convenient to simultaneously coat the ammonium salt composition with other water-soluble or dispersible materials. For example, ammonium nitrate-containing fertilizers can be simultaneously coated with from 0.01 to 5% by weight, based on total composition, of other materials such as herbicides, fungicides, growth regulators, insecticides, trace elements, soil sterilants, dyes, spreaders, conditioning agents and fertilizer components such as additional ammonium nitrate.

EXAMPLES

EXAMPLE 1

Preparation of hydroxy-aluminum nitrate polymer

Aluminum nitrate nonahydrate (75 g, 0.2 mol) water (75 g, 4.2 mol) and crystal urea (15.5 g, 0.26 mol) were refluxed together for 16 hours. No fumes could be seen coming from the reactor during this period. The clear solution which resulted was analyzed for aluminum content and hydroxyl content and found to have a hydroxyl to aluminum ratio of 2.39:1. The hydroxyl content was determined by direct titration after the addition of potassium oxalate to prevent hydrolysis of the aluminum ion. There was no loss of nitrogen during the process and the final solution contained 186% by weight of ammonium nitrate based on the weight of the $Al(OH)_{2.4}(NO_3)_{0.6}$ found.

The above hydroxy-aluminum polymer and ammonium nitrate solution is particularly useful for coating ammonium nitrate-containing fertilizer compositions because of the additional nitrogen nutrient value of the ammonium nitrate.

EXAMPLE 2

Preparation of hydroxy-aluminum nitrate polymer

The preparation of hydroxy-aluminum polymer was conducted in a series of experiments. Each experiment was conducted by heating 0.2 mol of aluminum nitrate nonahydrate (ANN) and varying amounts of aluminum powder and urea in 75 ml water at reflux temperature for about 16 hours. The molar ratio of reactants employed, ratio of hydroxyl to aluminum, and the weight percent aluminum content of the resulting hydroxy-aluminum nitrate polymer product are tabulated in Table I. The hydroxyl content was determined by direct titration after the addition of potassium oxalate to suppress the hydrolysis of the aluminum ion.

TABLE I

| Experiment No. | Reactant Mol Ratios | | Hydroxy-Aluminum Polymer Analysis | |
|---|---|---|---|---|
| | Urea/ANN | Al/ANN | % Al | OH/Al Ratio |
| 1 | 0 | 0 | 7.20 | 0 |
| 2 | 0 | 0.37 | 2.97 | 1.32 |
| 3 | 0 | 0.74 | 5.44 | 1.55 |
| 4 | 0 | 1.25 | 7.61 | 2.00 |
| 5 | 0 | 1.76 | 11.7 | 2.43 |
| 6 | 0.25 | 0 | 2.39 | 0.59 |
| 7 | 0.25 | 0.74 | 5.76 | 1.70 |
| 8 | 0.25 | 1.67 | 8.53 | 2.50 |
| 9 | 0.58 | 0 | 2.99 | 1.13 |
| 10 | 0.58 | 0.37 | 3.71 | 1.82 |
| 11 | 0.58 | 1.11 | 6.34 | 2.32 |
| 12 | 0.58 | 1.48 | 3.25 | 2.54 |
| 13 | 0.83 | 0 | 4.24 | 1.54 |
| 14 | 0.83 | 0.37 | 4.19 | 2.09 |
| 15 | 0.83 | 0.83 | 7.21 | 2.30 |
| 16 | 0.83 | 1.00 | 8.75 | 2.39 |
| 17 | 1.25 | 0 | 1.08 | 2.33 |
| 18 | 1.25 | 0.37 | 4.54 | 2.46 |

EXAMPLE 3

Preparation of hydroxy-aluminum nitrate polymer-coated 18-18-18 fertilizer composition Samples of an 18-18-18 fertilizer composition containing 37% ammonium nitrate, 29% potassium chloride and 31% ammonium phosphates were coated with a hydroxy-aluminum nitrate polymer solution prepared as described in Example 2, and having an OH/Al mol ratio of 2.38:1. The samples were coated by spraying the hydroxy-aluminum nitrate solution onto a bed of 18-18-18 in a laboratory fluid bed granulator. The bed temperature was controlled at 110°C±5°C. The coated samples of 18-18-18 were tested for caking tendency at two levels of moisture by the method of J. F. Wilson, J. C. Hillyer, V. C. Vives and R. E. Rensser, *Agricultural Chemicals*, page 42, September 1962, except that the heating-cooling cycle of the method was modified to have an upper limit of 175°F and a lower limit of 65°F. The level of hydroxy-aluminum nitrate polymer used and the results are tabulated in Table II.

TABLE II

| Sample No. | Additive Level (wt.% Al)* | Moisture Content (wt. %) | Caking Tendency (psi) |
|---|---|---|---|
| 1 | None | 0.04% | 295 |
| 2 | None | 0.70% | 275 |
| 3 | 0.37 | 0.41% | 39 |
| 4 | 0.37 | 0.86% | 260 |
| 5 | 0.81 | 0.48% | 4 |
| 6 | 0.81 | 0.80% | 262 |
| 7 | 1.07 | 0.79% | 9 |
| 8 | 1.07 | 1.24% | 105 |

*as $Al(OH)_{2.38}(NO_3)_{0.62}$

EXAMPLE 4

Preparation of hydroxy-aluminum nitrate polymer-coated 27-12-0 fertilizer composition Samples of 27-12-0 fertilizer composition containing 52% ammonium nitrate and 21% ammonium phosphates and having a particle size of −6+12 Tyler mesh were coated by spraying the composition with an aqueous solution of hydroxy-aluminum nitrate polymer (prepared by the procedure of Example 2 and having an OH/Al mol ratio of 2.38:1) and simultaneously drying the sprayed composition at about 105°C. The caking tendency of the fertilizer composition was then determined at various moisture levels without the further addition of any conventional coating or parting agent. The results are tabulated in Table III. Each of the hydroxy-aluminum polymer coated fertilizer compositions tabulated in Table III were essentially dust-free.

TABLE III

| Sample No. | Additive Level (wt.% Al)* | Moisture Content (wt.%) | Caking Tendency (psi) |
|---|---|---|---|
| 1 | None | 0.35 | 170 |
| 2 | None | 0.52 | 267 |
| 3 | None | 0.76 | 301 |
| 4 | 0.82 | 0.68 | 6 |
| 5 | 0.82 | 0.80 | 15 |
| 6 | 0.82 | 0.99 | 241 |
| 7 | 0.50 | 0.59 | 6 |
| 8 | 0.50 | 0.70 | 26 |
| 9 | 0.50 | 0.92 | 285 |
| 10 | 0.15 | 0.46 | 27 |
| 11 | 0.15 | 0.65 | 53 |
| 12 | 0.15 | 0.73 | 273 |

*as $Al(OH)_{2.38}(NO_3)_{0.62}$

EXAMPLE 5

Preparation of hydroxy-aluminum nitrate polymer-coated ammonium nitrate fertilizer composition Samples of prilled ammonium nitrate containing no conventional coating agent and having a particle size of −8+12 Tyler mesh were coated with a hydroxy-aluminum nitrate polymer solution prepared as described in Example 2 and having an OH/Al mol ratio of 2.38:1. The samples were coated by spraying the hydroxy-aluminum nitrate solution onto a bed of the ammonium nitrate prills in a laboratory fluid bed granulator. The bed temperature was controlled at 105°±5°C. The caking tendency of the fertilizer composition was then determined at two moisture levels. The results are tabulated in Table IV. Each of the hydroxy-aluminum polymer-coated fertilizer compositions in Table IV were essentially dust-free and were tested for caking tendency without the further addition of any conventional coating or parting agent such as is used in the fertilizer industry.

TABLE IV

| Sample No. | Additive Level (wt.% Al)* | Moisture Content (wt.%) | Caking Tendency (psi) |
|---|---|---|---|
| 1 | None | 0.03 | 171 |
| 2 | " | 0.20 | 230 |
| 3 | 0.25 | 0.23 | 60 |
| 4 | " | 0.49 | 177 |
| 5 | 0.52 | 0.39 | 21 |
| 6 | " | 0.65 | 151 |
| 7 | 0.88 | 0.56 | 30 |
| 8 | " | 0.86 | 74 |

*as $Al(OH)_{2.38}(NO_3)_{0.62}$

What is claimed is:

1. A particulate ammonium salt composition coated with from about 0.01 to 5% by weight, based on weight total composition, of a hydroxy-aluminum polymer having a hydroxyl-to-aluminum mol ratio of about 1 to 2.9.

2. The coated composition of claim 1 wherein the composition is macroparticles of greater than 20 Tyler mesh.

3. The coated composition of claim 1 wherein the composition is prills or granules.

4. The coated composition of claim 3 wherein the composition is an ammonium salt-containing fertilizer.

5. The coated composition of claim 4 wherein the ammonium salt is ammonium nitrate or sulfate, or a mixture thereof.

6. The coated composition of claim 4 wherein the composition is an ammonium nitrate-containing fertilizer.

7. The coated composition of claim 4 wherein the composition is an ammonium phosphate-containing fertilizer.

8. The coated composition of claim 4 wherein the amount of hydroxy-aluminum polymer is from about 0.5 to 5% by weight and the hydroxyl-to-aluminum mol ratio is about 1.7 to 2.7.

9. The coated composition of claim 8 wherein the hydroxy-aluminum polymer is hydroxy-aluminum nitrate, sulfate or chloride and the hydroxyl-to-aluminum mol ratio is about 2.0 to 2.5.

10. The coated composition of claim 9 wherein the hydroxy-aluminum polymer is hydroxy-aluminum nitrate.

11. The coated composition of claim 10 wherein the composition is an ammonium nitrate-containing fertilizer.

12. The coated composition of claim 11 wherein the composition is an ammonium nitrate/ammonium phosphate-containing fertilizer composition.

13. The coated composition of claim 11 wherein the composition is an ammonium nitrate/ammonium phosphate/potassium chloride fertilizer composition.

14. The coated composition of claim 1 wherein the composition is coated with from about 0.1 to 5% by weight, based on total composition, of a hydroxy-aluminum polymer, and with from about 0.01 to 5% by weight, based on total composition, of ammonium nitrate.

* * * * *